Figure 1:
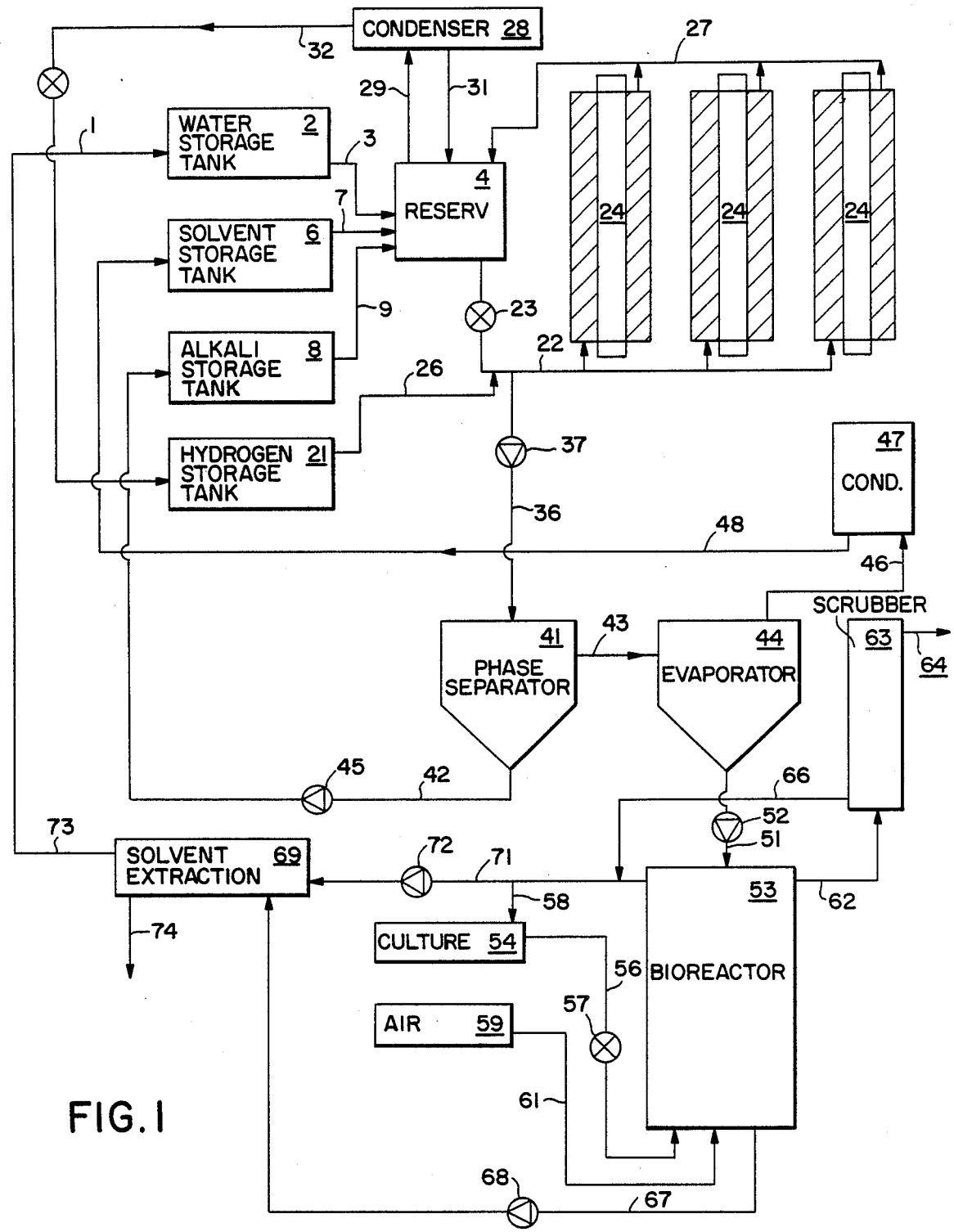

United States Patent [19]

Evers et al.

[11] Patent Number: 4,956,064
[45] Date of Patent: Sep. 11, 1990

[54] DEHALOGENATION OF HALOGENATED ORGANIC COMPOUNDS

[75] Inventors: Dennis Evers, Kenmore; Robin Craig, Helensvale, both of Australia

[73] Assignee: Biotox Pty. Ltd., Australia

[21] Appl. No.: 358,466

[22] Filed: May 30, 1989

Related U.S. Application Data

[63] Continuation of Ser. No. 69,362, Jul. 2, 1987, abandoned.

[30] Foreign Application Priority Data

Jul. 2, 1986 [AU] Australia ............................... PH6691
Mar. 4, 1987 [AU] Australia ............................... PI0658

[51] Int. Cl.$^5$ .......................... B01J 19/08; C12P 1/04
[52] U.S. Cl. ................................. 204/157.94; 435/166; 435/170
[58] Field of Search .................... 204/157.94–157.99, 204/158.1, 158.11, 158.12, 158.21; 435/166, 170

[56] References Cited

U.S. PATENT DOCUMENTS

| | | | |
|---|---|---|---|
| 3,004,908 | 10/1961 | Haszeldine | 204/158.21 |
| 4,144,152 | 3/1979 | Kitchens | 204/157.98 |
| 4,284,516 | 8/1981 | Parker | 252/181 |
| 4,447,541 | 5/1984 | Peterson | 71/903 |
| 4,532,028 | 7/1985 | Peterson | 208/262 |
| 4,574,013 | 3/1986 | Peterson | 134/25.1 |
| 4,632,742 | 12/1986 | Tundo | 204/158.21 |

Primary Examiner—John F. Niebling
Assistant Examiner—Ben C. Hsing
Attorney, Agent, or Firm—Andrus, Sceales, Starke & Sawall

[57] ABSTRACT

A process for dehalogenation of halogenated organic compounds comprising irradiating a two phase liquid solution containing said compounds with ultraviolet radiation. The two phase liquid is comprised of an organic phase and an alkaline aqueous phase with the halogenated organic compound in said organic phase, the ultraviolet treatment followed by a biological degradation to completely dehalogenate the organic compound.

19 Claims, 1 Drawing Sheet

DEHALOGENATION OF HALOGENATED ORGANIC COMPOUNDS

This is a continuation of application Ser. No. 069,362, filed July 2, 1987, now abandoned.

This invention relates to dehalogenation of halogenated organic compounds. This invention also relates to degradation of halogenated organic compounds. This invention also relates to disposal of halogenated organic compounds.

Halogenated organic compounds are used for a variety of purposes including pesticides such as chlordane, DDT and Lindane, fumigants, solvents such as chlorobenzenes, and insulating fluids such as polychlorinated biphenyls (PCBs). These chemicals are often chemically stable and the substituent halogen atoms often cause them to be highly resistant to microbial degradation. Thus many of these chemicals are severe pollutants, lasting for decades in the environment and accumulating in the food chain with detrimental effects on animals and man.

Much attention has been focused on the development of methods for the safe disposal of such chemicals. Chemical methods such as incineration often have undesirable properties including generation of toxic by-products causing further pollution, or inability to totally degrade the chemicals. Biological methods are often too slow or incomplete. For example, while PCB isomers with few chlorines are readily metabolized by certain bacteria, PCBs with many chlorines are digested slowly if at all. Much work is being done to improve microbial performance in this regard, but the development or isolation of bacteria capable of rapid destruction of all PCB isomers is considered some years off.

Ultra-violet radiation has also been used with some success but is limited by the long treatment times that are necessary and the need to use dilute solutions of halogenated compounds.

The present invention provides a process for degradation of a polyhalogenated organic compound comprising irradiating a polyhalogenated organic compound with ultra-violet light to produce a lesser halogenated organic compound and thereafter biologically degrading said lesser halogenated organic compound.

Said irradiation is preferably performed so as not to completely dehalogenate said polyhalogenated organic compound.

Preferably said polyhalogenated compound is in a liquid medium during said irradiation in an amount of at least 1,000 ppm, more preferably at least 5,000 ppm, still more preferably 7,500 to 15,000 ppm and most preferably about 10,000 ppm.

Preferably said polyhalogenated compound is subjected to from 1,000 to 20,000, more preferably 2,000 to 10,000 and most preferably 3,000 to 6,000 milliwatt hours of ultra-violet radiation per gm of polyhalogenated organic compound.

Preferably said polyhalogenated compound in a liquid medium is subjected to from 50 to 1,000 more preferably 100 to 1,500 most preferably 150 to 300 milliwatt hours of ultra-violet radiation per square centimeter of a surface of said medium while the depth of said medium and/or volume are such that the area irradiated is from 10 to 25 square cm per gm polyhalogenated compound dissolved therein. Said irradiation is increased or decreased for lesser or greater irradiated areas and dependent on the proportion of said volume which is being effectively irradiated at any one time, said medium is circulated or made turbulent to improve average exposure per molecule.

Preferably said medium is comprised of two substantially immiscible phases. One of said phases is preferably an aqueous phase and the other of said phases is preferably an organic solvent for the polyhalogenated organic compound.

Said organic solvent may be a non-polar solvent but, since removal of chlorine is conveniently effected in part by salt formation, it is considered more convenient that said organic solvent be a polar solvent.

Since polar solvents are commonly soluble in water such that said organic solvent and said aqueous phase might be miscible, it is particularly preferred that said aqueous phase be a solution such as to be substantially immiscible with the organic solvent.

Thus, the aqueous phase may contain ingredients to effect the obtaining of two phases.

In a preferred aspect said aqueous phase contains an alkali. Suitable alkalis include sodium hydroxide and potassium hydroxide. Of these sodium hyroxide is preferred by reason of cost.

Preferably said aqueous phase contains at least 8%, more preferably at least 10% by weight of an alkali. Said aqueous phase may be saturated with alkali, and in practice this will amount to about 40% by weight.

Preferably said aqueous phase comprises from 10% to 50% by weight of said medium with 15 to 30% being more preferred and about 25% being most preferred.

As said organic solvent there may be used a non-polar solvent such as hexane but it is preferred to use an alcohol such as methanol, ethanol, butanol or propanol.

Particularly preferred is to use isopropanol as said organic solvent.

Solvents may be recycled if desired.

Said irradiation is preferably conducted while passing hydrogen gas through said medium.

The amount of hydrogen passed through said medium is preferably 50–60 ml per minute of hydrogen gas (STPbase) or equivalent at other temperatures or pressures per 1,200 ml of said medium or 4–5 ml per minute per gram or per ml of polyhalogenated organic compound.

Unutilised hydrogen gas may be recycled.

The biological degradation may involved the use of a wide variety of cells and amongst these we mention cells deposited by the inventors with ATCC of 12301 Parklawn Drive, Rockville Md 20852 and referenced.

| STRAIN NUMBER | TAXONOMY |
| --- | --- |
| GCC 128 | Alcaligenes sp. |
| GCC 142 | Pseudomonas sp. |
| GCC 179 | Unidentified yellow gram-negative bacterium |
| GCC 184 | Alcaligenes sp. |
| GCC 190 | Pseudomonas sp. |

The above have also been deposited with ACMM (Australian Collection of Marine Micro-Organisms) as ACMM 600 to 604.

NCIB 10643 (Pseudomonas sp.) and NCIB 10504 (Flavobacterium sp.) are also known biphenyl-utilizing strains. NCIB is the National Collection of Industrial Bacteria of Torrey Research Station, Aberdeen, (U.K.).

Other useful strains are the dichlorobenzoate-degrading strains Pseudomonas HCV(2,4) DCB (ATCC 31942) and Pseudomonas HCV(3,4) DCB (ATCC 31940) described in European Patent Application No. 85108991.4 (chlorobenzoic acids are common metabolites of chlorinated biphenyls).

It should be noted that the particular micro-organism utilized in the biological degradation is not of the essence of this invention and the above mentioned organisms are not the only ones which might be used. Fruitful sources of further micro-organisms would be by isolation from halogenated organic chemical contaminated soil. Genetically modified material might also be used.

The biological degradation may be performed under aerobic or anaerobic conditions or a combination of both. A bromass may be suspended in a fixed film reactor or in a fluidized bed or a combination of both. Surplus biomass may be used as a soil conditioner.

Preferred apparatus for performing the present invention is shown in the accompanying drawing in which:

FIG. 1 is a schematic drawing of the apparatus.

The apparatus comprises an input line 1 for PCB or other polyhalogenated organic chemical waste, a storage tank 2 for such waste, a line 3 between tank 2 and a reservoir 4, a storage tank 6 for solvent (usually isopropanol), a line 7 between tank 6 and the reservoir 4, a storage tank 8 for aqueous alkali and a line 9 between tank 8 and the reservoir 4.

The apparatus further comprises a storage tank 21 for hydrogen gas, a line 22 between the reservoir 4 and UV treatment chambers 24 and fitted with a circulating pump 23, a line 26 connecting the tank 21 to the UV treatment chambers 24 and a line 27 connecting the outputs of the chambers 24 with the reservoir 4. In use the pump 23 will circulate fluid through the UV treatment chambers 24.

The reservoir 4 is also connected to a condenser 28 via a line 28. A return line 31 for condensate is provided and a line 32 for recycling hydrogen to the tank 21 is provided.

Connected to the line 22 is a line 36 for passing fluid treated to the desired extent in the UV treatment chambers 24 to a separation section. The line 36 is provided with a non-return valve 37.

The separation section comprises a phase separator 41, a line 42 for returning aqueous alkali to the tank 8 via a one way valve 45, a transfer line 43 for passing the solvent, usually isopropanol, to an evaporator 44, a line 46 for passing vaporised solvent to a condenser 47 and a line 48 for recycling solvent to the tank 6.

PCB material is transferred from the evaporator 44 via a line 51 fitted with a non-return valve 52 to a biological degradation section.

The biological degradation section comprises a bioreactor 53 to which a culture medium is supplied from a tank 54 via line 58 and pump 57 and with return line 58. An air supply 59 and supply line 61 for the bioreactor 53 is also provided.

Air from the bioreactor 53 is passed via line 62 to a scrubber 63 from where clean air may pass out as 64 and liquid material may be returned to the bioreactor via line 66.

Waste sludge may pass from the bioreactor via line 67 via a one way valve 68 to a solvent extraction apparatus 69 and liquid from the bioreactor 53 can be passed to that solvent extraction apparatus 69 by a line 71 fitted with a one way valve 72.

Remaining PCB waste extracted in the solvent extraction apparatus may be returned to the tank 2 via line 73 and non-toxic waste can exit at 74.

The preferred form and manner of use of the above apparatus is given below by way of Example.

EXAMPLE 1

The waste material to be destroyed is either fed directly into the bioreactor 53 (if already of sufficiently low percent halogenation) or dissolved in isopropanol from tank 2 to a level of 1%–10% w/v. Aqueous NaOH, 8%–40% w/v, is added from the tank 8 to form a two phase mixture. Typical ratios used for the treatment of polychlorinated biphenyls ratios used for the treatment of polychlorinated biphenyls (PCB) would be, per liter, 10 ml of PCB in 740 ml of isopropanol, and 25 g of NaOH in 250 ml aqueous solution. On mixing and settling two clear phases are formed: a larger, less dense organic phase and a smaller, denser aqueous phase. This mixture is pumped through the UV treatment chambers 24 apparatus containing low-pressure mercury lamps with peak emission at 180 nm and/or 254 nm light along with a high flux of hydrogen gas (50–60 ml/minutes or 4–5 ml per minute per gram or per ml of PCB). The effluent gas is passed through the condensor 28 and trapped solvent and PCB is recycled. The hydrogen itself is also recycled (therefore pre-condensation of vapours may be omitted).

When sufficient dehalogenation has been achieved (for example, when PCB has been converted into a mixture consisting almost entirely of biphenyl, monochlorobiphenyls and dichlorobiphenyls), the mixture is withdrawn and the aqueous phase removed in the phase separator 41. This may be re-used, or the alkali and any contaminating PCB extracted and recycled.

The organic phase is then transferred to the evaporator 44 and the solvent evaporated off and recycled. The PCB may then be further extracted free of salts and alkali using partitioning between hexane and water, or used directly in the bioreactor 53.

The bioreactor 53 may be of any suitable type, including free cells or immobilized cells in a stirred tank, column or fluidized bed. The preferred method is to use immobilized cells, aerated in a tank or fluidized bed. The cells may be one or a mixture of several bacterial strains isolated from the environment by standard enrichment techniques, obtained from culture collections, and/or improved by standard genetic or recombinant DNA techniques. For PCB degradation, this strain or strains would be capable of degrading biphenyl and oligochlorinated biphenyls completely to carbon dioxide, water and chloride ions. Ability to degrade PCBs with several chlorines is advantageous for aiding the destruction of residual PCBs, but is not necessary for the process.

The immobilized cells are re-used until performance degrades. Effluent during treatment and discarded bioreactor material are treated by solvent extraction in the apparatus 89, to recover any unused PCBs or metabolites, which are then recycled. Waste biomass may be further used as a fermentation feedstock or source of fertilizer.

EXAMPLE II

Dechlorination of Aroclor 1260 by UV process

Method: 790 ml isopropanol, 12 ml PBC, 400 ml 20% (w/v) aqueous NaOH. Hydrogen flow rate 50 ml/min. PCBs were analyzed using wide-bore capillary gas chromatography using both ECD (electron capture detector) and FID (flame ionization detector) detectors using standard techniques. The FID traces were used to calculate the percentages of each class of compound. BP+biphenyl, MCB+monochlorobiphenyl, DCB+dichlorobiphenyl, PCB+all compounds with longer retention time than DCB.

| Percentages of Biphenyl Compounds | | | | |
|---|---|---|---|---|
| Time(hr) | BP | MCB | OCB | PCB |
| 0 | 0 | 0 | 0 | 100% |
| 4 | 5% | 31% | 58% | 6% |
| 7 | 12% | 64% | 24% | 0% |
| 23 | 52% | 48% | 0% | 0% |

The UV treatment chamber 24 used in this instance comprised an inner tube containing a UV lamp having an output at the tube exterior surface of 29,000 microwatt/square cm.

The tube had a diameter of 2.4 cm, effective length of 25 cm and effective surface area of 196 square cm and was surrounded by a stainless steel tube of 6 cm diameter and length 25 cm. The annulus between the two tubes had a volume of about 640 ml. The volume of circulating solvent, PCB an aqueous alkal was about 1200 ml. The PCB was, as stated, about 12 ml.

From the above it can be calculated that the total output of the lamp was about 5,684 milliwatt and over an 8 hour treatment time this is a total irradiation of 45,472 milliwatt hour.

As 12 ml of PCB was treated this is a rate of 3,789 milliwatt hour per ml of PCB.

The UV absorbance of polyhalogenated organic chemicals is high. For example, we have measured the absorbance (254 nm, path length 1 cm) of 10 ppm biphenyl in isopropanol at over 1; that is 90% of UV light of 254 nm is absorbed per cm even in very dilute solutions. At the concentration used in this invention the radiation is absorbed close to the lamp. Thus the depth of the liquid (the distance between the lamp and the vessel walls) is not critical provided that most of the UV light is absorbed over that distance ensuring efficient use of the lamp. It is preferred that the liquid flow is turbulent to ensure good exposure per molecule.

Microbial strains useful for degradation of treated PCB

Microbial stains suitable for degrading chlorinated and non-chlorinated biphenyl can be isolated from soils contaminated by PCBs using standard enrichment techniques. Alternatively, previously isolated stains can be obtained from culture collections. The following strains have been isolated from contaminated soils by biphenyl enrichment and have been found to metabolize rapidly biphenyl and monochlorobiphenyl. These have been deposited at the ATCC. Our strain identification numbers and provisional identifications are shown below.

| STRAIN NUMBER | TAXONOMY |
|---|---|
| GCC 128 | Alcaligenes sp. |
| GCC 142 | Pseudomonas sp. |
| GCC 179 | Unidentified yellow gram-negative bacterium |
| GCC 184 | Alcaligenes sp. |
| GCC 190 | Pseudomonas sp. |

NCIB 10843 (Psuedomonas sp.) and NCIB 10504 (Flavobacterium sp.) are also known biphenyl-utilizing strains, though we do not know whether they degrade chlorinated biphenyl, NCIB is the National Collection of Industrial Bacteria (U.K.)

Other useful strains are the dichlorobenzoate-degrading strains Pseudomonas HCV(2,4) DCB (ATCC 31842) and Pseudomonas HCV(3,4) DCB (ATCC 31940) described in European Patent Application No. 85108991.4 (chlorobenzoic acids are common metabolites of chlorinated biphenyls).

Examples of Microbial degradation of treated PCBs (1) A mixture of GCC 142, GCC 179, GCC 184 and GCC 190 were immobilized in 2% egar beads (average diameter <1 mm) and grown to saturation within the beads by incubation in rich medium (tryptons soya broth, Oxoid) with aeration overnight. To a 50% slurry of washed beads in minimal salt medium containing 0.5% Tween 80 detergent was added treated, concentrated PCB to 0.1%. The treated PCB consisted of approximately 11% BP, 74% MCB and 15% DCB. After shaking at 30° C. for 16 hr. the culture was acidified with 1% by volume of 70% percholric acid then extracted with ether and analyzed by GC. DCB was still present but all the BP and MCB had been destroyed. Control cultures grown under identical conditions but with killed bacteria showed only small losses of BP and MCB. Silylation of the ether phase by standard techniques revealed only minor amounts of chlorobenzoate, a metabolite of PCBs, indicating further metabolism was occurring.

Siimilar results are found with free cells (is, not immobilized) provided that the treated PCBs are first emulsified (for example, as a 5% emulsion in water before addition to the bacterial culture) by sonication or by an industrial emulsifier, to increase availability to the bacteria.

The presence of detergent accelerates the rate of breakdown of the treated PCB but is not required.

(2) GCC 128 was grown overnight in rich medium, washed and suspended at absorbance 3(615 nm) in minimal medium plus 0.5% Tween 80. A 3:1 mixture of treated PCB (MCB+BP) and untreated Arochlor 1242 as an internal standard was thoroughly emulsified and added to a concentration of 0.1%, and the culture was shaken at 30° C. After an induction period of about 2 hr during which little degradation occurred, total degradation of the treated PCB occurred in the next 2.5 hr, while no detectable degradation of more highly chlorinated species occurred. Subsequently added 0.1% of substrate was also completely degraded, with respect to BP and MCB, within 2-3 hr. Large amounts of chlorobenzoates were detected in the culture, however, indicating that simultaneous or subsequent treatment with other bacteria such as ATCC 31940 and ATCC 31942 would be desirable to completely degrade chlorinated species.

The above process has the advantage that it combines the strengths, and compensates for the weaknesses, of each part. In the UV part, partial dehalogenation from many to few halogen substituents is more rapid than subsequent total dehalogenation; also, the final products may be undesirable. In contrast, while micro-organisms capable of rapidly degrading organics with a few halogen substituents may readily be isolated from the environment, ones capable of rapid and at least substantially complete degradation of highly halogenated compounds are not.

The claims form part of the disclosure of this specification.

The claims defining the invention are claimed as follows:

1. A process for degradation of a polyhalogenated organic compound, comprising the steps of admixing an aqueous phase containing a water soluble alkaline material and an organic solvent phase, said solvent phase being miscible with water and containing a polyhalogenated organic compound, maintaining the concentration of said alkaline material at a value sufficiently high to provide a two-phase system, subjecting the two-phase system to ultra-violet irradiation to produce a lesser halogenated organic compound, and thereafter biologically degrading said lesser halogenated organic compound.

2. A process for degradation of a polyhalogenated organic compound as claimed in claim 1, wherein said irradiation is performed to incompletely dehalogenate said polyhalogenated organic compound.

3. A process for degradation of a polyhalogenated organic compound as claimed in claim 1, wherein said polyhalogenated organic compound is in a liquid medium during said irradiation in an amount of at least 1,000 ppm.

4. A process for degradation of a polyhalogenated organic compound as claimed in claim 3, further comprising performing said irradiation while passing hydrogen gas through said two-phase system.

5. A process for degradation of a polyhalogenated organic compound as claimed in claim 4, wherein 4–5 ml per minute of hydrogen gas per gm or per ml of said polyhalogenated organic compound is passed into said two-phase system.

6. A process for degradation of a polyhalogenated organic compound as claimed in claim 1, wherein said polyhalogenated organic compound is in a liquid medium during said irradiation in an amount of 1,000 to 100,000 ppm.

7. A process for degradation of a polyhalogenated organic compound as claimed in claim 1, wherein said polyhalogenated organic compound is in a liquid medium and subjected to at least 1,000 milliwatt hours of ultra-violet radiation per gm of said polyhalogenated organic compound.

8. A process for degradation of a polyhalogenated organic compound as claimed in claim 1, wherein said polyhalogenated organic compound is in a liquid medium and subjected to 1,000 to 20,000 milliwatt hours of ultra-violet radiation per gm of said polyhalogenated organic compound.

9. A process for degradation of a polyhalogenated organic compound as claimed in claim 1, wherein said polyhalogenated organic compound is in a liquid medium and subjected to 50 to 1,000 milliwatt hours of ultra-violet radiation per square cm of a surface of said medium while the depth or volume of said medium are such that the area irradiated is from 10 to 25 square cm per gm polyhalogenated compound.

10. A process for degradation of a polyhalogenated organic compound as claimed in claim 1, wherein said alkaline material is present as at least 8% by weight in said aqueous phase.

11. A process for degradation of a polyhalogenated organic compound as claimed in claim 1, wherein said alkaline material is present as at least 10% by weight in said aqueous phase.

12. A process for degradation of a polyhalogenated organic compound as claimed in claim 1, wherein said organic solvent is an alcohol.

13. A process for degradation of a polyhalogenated organic compound as claimed in claim 12, wherein said organic solvent is isopropanol.

14. A process for degradation of a polyhalogenated organic compound as claimed in claim 1, wherein said aqueous phase comprises from 5 to 50% by weight of a said two phases system.

15. A process for degradation of a polyhalogenated organic compound as claimed in claim 1, wherein said aqueous phase comprises from 15 to 30% by weight of said two phase system.

16. A process for degradation of a polyhalogenated organic compound as claimed in claim 1, wherein said irradiation is performed over a period not in excess of 12 hours.

17. A process as claimed in claim 1, wherein the biological degradation is performed using an organism adapted to degrade said lesser halogenated compound but not adapted to substantially degrade said polyhalogenated compound.

18. A process for degradation of a polyhalogenated organic compound as claimed in claim 1 wherein the biological degradation is performed under aerobic conditions.

19. A process for degradation of a polyhalogenated organic compound as claimed in claim 1 wherein a liquid material obtained from the biological degradation is solvent extracted to remove undegraded halogenated organic compounds which are recycled to the irradiation step.

* * * * *